United States Patent [19]

Taniguchi

[11] Patent Number: 5,696,596

[45] Date of Patent: Dec. 9, 1997

[54] ELECTROSTATIC STEREOSCOPIC IMAGE RECORDING METHOD AND APPARATUS

[75] Inventor: Naosato Taniguchi, Urawa, Japan

[73] Assignee: Canon Kabushiki Kaisha, Tokyo, Japan

[21] Appl. No.: 497,293

[22] Filed: Jun. 30, 1995

[30] Foreign Application Priority Data

Jul. 5, 1994 [JP] Japan .................................. 6-153984

[51] Int. Cl.$^6$ .............................. H04N 1/21; H04N 1/387
[52] U.S. Cl. ........................ 358/300; 358/296; 347/112; 355/22
[58] Field of Search ...................... 355/22, 33; 358/298, 358/300; 347/111, 112

[56] References Cited

U.S. PATENT DOCUMENTS

| | | | |
|---|---|---|---|
| 5,049,987 | 9/1991 | Hoppenstein | 348/48 |
| 5,113,213 | 5/1992 | Sandor et al. | 355/22 |
| 5,362,351 | 11/1994 | Karszes | 156/243 |
| 5,424,553 | 6/1995 | Morton | 250/548 |
| 5,436,738 | 7/1995 | Manico | 355/22 |
| 5,455,689 | 10/1995 | Taylor et al. | 355/33 |
| 5,539,487 | 7/1996 | Taguchi et al. | 355/22 |

FOREIGN PATENT DOCUMENTS

583766-A1  2/1994  European Pat. Off.  ........ G02B 27/22

OTHER PUBLICATIONS

Japanese Patent Abstract 5-216138, Aug. 27, 1993.

Primary Examiner—Peter S. Wong
Assistant Examiner—Derek J. Jardieu
Attorney, Agent, or Firm—Morgan & Finnegan L.L.P.

[57] ABSTRACT

After a plurality of parallax images either obtained from an external camera or generated by a computer are divided into a plurality of image strips, respectively, a combined image is formed from the plurality of image strips, and recorded on a photo sensing drum as a latent image. Next, the latent image is transferred or printed on backside of a lenticular sheet, made from a transparent plastic, with toner or ink, thereby forming a stereoscopic image display medium. Accordingly, a high definition stereoscopic image of good contrast can be printed out at high speed by using a printer having a simple configuration.

19 Claims, 7 Drawing Sheets

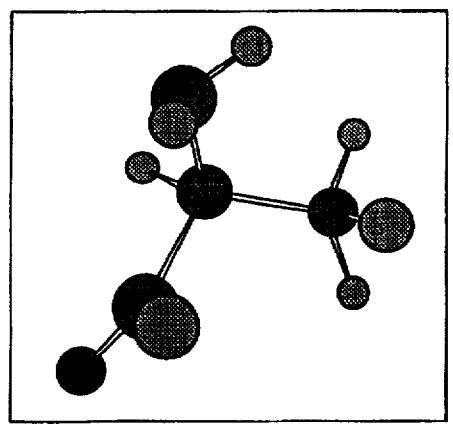
MOLECULAR MODEL IMAGE A
F I G. 2A
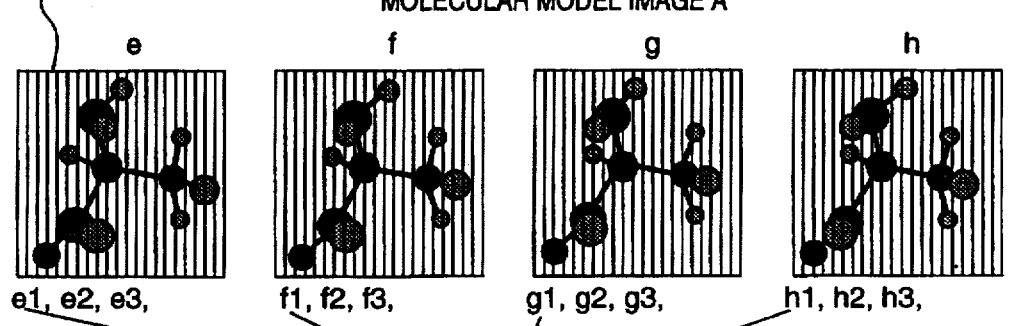
F I G. 2B
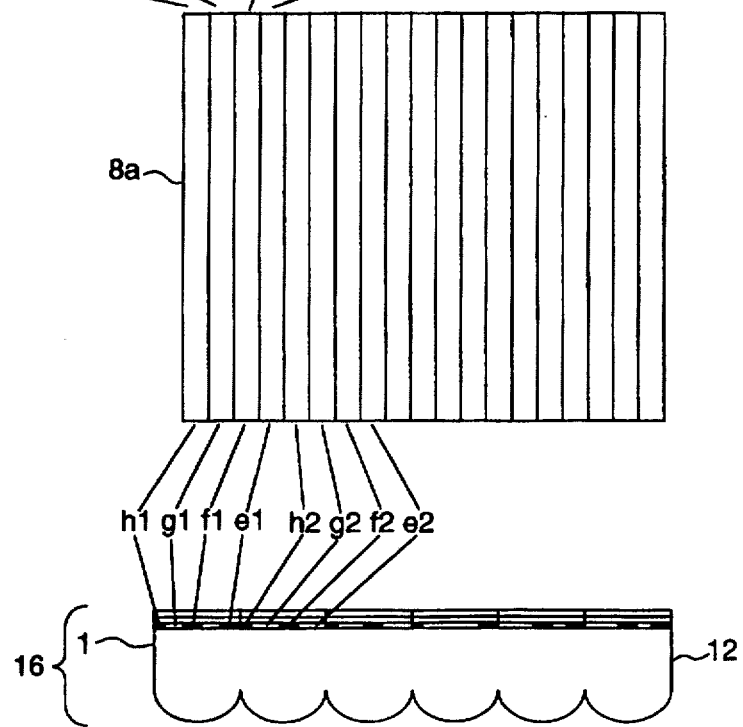

ENLARGED VIEW

ELECTROSTATIC STEREOSCOPIC IMAGE RECORDING METHOD AND APPARATUS

BACKGROUND OF THE INVENTION

The present invention relates to a stereoscopic image recording method and apparatus which arrange a plurality of input two dimensional images to generate a single image (combined image) to be seen as a stereoscopic image through a lenticular lens sheet (referred as "lenticular sheet", hereinafter) and record the combined image, and a stereoscopic image display medium which enables to display the combined image so as to be seen as a stereoscopic image.

There is a well known conventional method for generating a stereoscopic image in which a plurality of images of a single object picked up from a plurality of viewpoints are divided into images of strip shape (referred as "image strips", hereinafter), and the image strips are arranged, and printed as a single image, then the image strips of the displayed image for the right eye and the image strips of the displayed image for the left eye are observed by the right eye and the left eye, respectively, through a lenticular sheet. In Stereoscopy by N. A. Valyus (Focal Press, New York, 1966), there is disclosed a method in which an image for the right eye (right image), and an image for the left eye (left image) of a stereoscopic image are simultaneously exposed in a single film. Further, in Japanese Patent Publication No. 56-31578, an apparatus which expands and forms a great number of two dimensional images and projects the expanded two dimensional images on a lenticular recording medium through a projection lens, thereby optically recording images to be seen as a stereoscopic image is disclosed.

In the above optical recording apparatuses, a complicated optical device for projecting the images which are taken from viewpoints that are separated by the distance between the right and left human eyes (referred as "parallax images", hereinafter) is necessary. Moreover, when great number of parallax images are to be recorded in order to obtain a high definition stereoscopic image, an optical device of very high precision is required, which results in making the apparatus very complicated.

Thus, in Japanese Patent Application Laid-Open No. 5-216138, there is disclosed a simple stereoscopic image recording method in which recording materials are applied on the backside of a lenticular sheet (flat side), then image recording materials are scanned and exposed by a beam representing the image strips from the backside of the sheet, thereby solving the problem of the aforesaid conventional optical recording apparatus as well as making it unnecessary to adhere the lenticular sheet to recording materials after the image strips are recorded.

However, since the recording materials is scanned and exposed from the backside of the lenticular sheet according to the above method, photo sensing layers of the recording materials corresponding to each color which are formed in a recording layer have to be laid in opposite order to that of the recording layer of the conventional lenticular sheet. As a result, there is a problem in which cost for manufacturing the recording layer is high. In addition, a developing process which is proper to the recording materials have to be chosen in accordance with type of its photo sensing layer. Especially, when a silver salt photo sensing material is used, a wet developing process has to be performed, thus it takes time to form an image. Furthermore, with regard to the above developing process, maintenance of an apparatus, such as supplementing, disposing, and managing the developer, is quite troublesome, thus use of the apparatus becomes troublesome as a whole.

SUMMARY OF THE INVENTION

The present invention has been made in consideration of the above situation, and has its object to provide a stereoscopic image recording method and apparatus capable of recording images, seen as a high definition stereoscopic image, by a simple process.

It is another object of the present invention to provide a stereoscopic image display medium on which images, seen as a high definition stereoscopic image of good contrast, are formed and which is hard enough to resist scratch and other damages.

According to the present invention, a plurality of parallax images are divided into image strips, these image strips are arranged to form a single combined image, and the combined image is recorded in a photo sensing medium as a latent image, then the latent image is copied or printed on the backside of a lenticular sheet with toner, ink, and the like. Thereby, it is possible to easily record images, seen as a high definition stereoscopic image, without sticking a recording medium to a lenticular sheet with high precision nor using an expensive and complicated optical device. Further, a developing process which has been necessary for a conventional stereoscopic image recording method becomes unnecessary, thus the images to be seen as the stereoscopic image can be printed out at near real time.

Further, according to the present invention, the above combined image is copied or printed on the backside of the lenticular sheet with toner, ink, and the like, thus it is possible to form the images, seen as the high definition stereoscopic image, of good contrast.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are explanatory views showing each step of a stereoscopic image recording method of the present invention;

DETAILED DESCRIPTION OF THE PREFERRED EMBODIMENT

Preferred embodiment of the present invention will be described in detail in accordance with the accompanying drawings.

Figure 1:
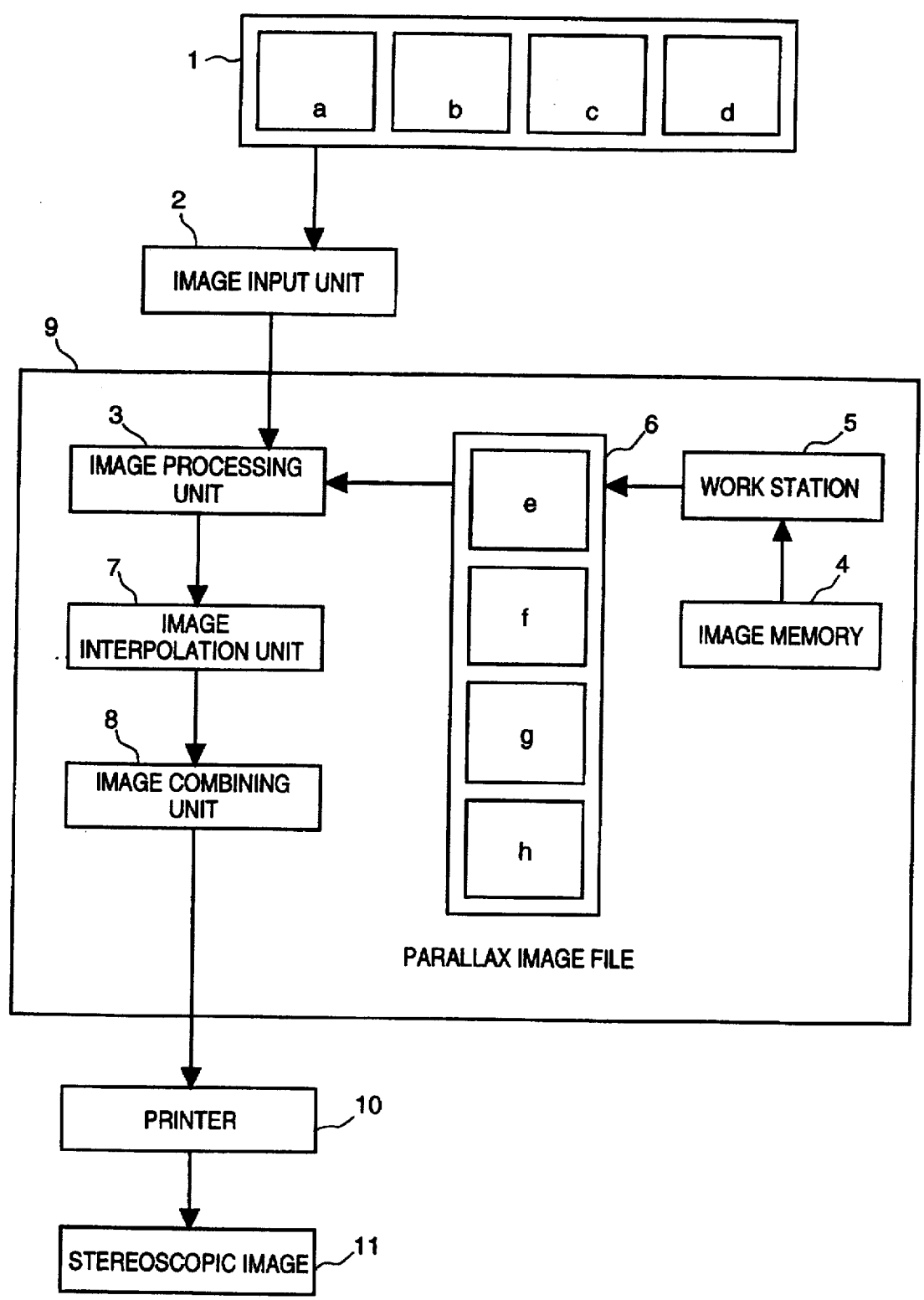
FIG. 1 is a block diagram illustrating a configuration of a stereoscopic image recording apparatus according to an embodiment of the present invention.

FIG. 1 is a block diagram showing a configuration of a recording apparatus which employs a stereoscopic image recording method according to an embodiment of the present invention. In FIG. 1, reference numeral 1 denotes a plurality of parallax images; 2, an image input unit as image reading means; 9, a computer system for processing and combining input images; and 10, a printer for transferring or printing the combined image on a lenticular sheet.

The plurality of parallax images 1 can be obtained by using known stereoscopic camera and a multi-eyes camera, or by simultaneously sensing with a plurality of cameras of the same type, provided at a predetermined distance from each other. In this embodiment, four images a, b, c, and d are used for simplicity, however, the number of images to be used is not limited to four. These images a, b, c, and d are read by the image input unit 2 composed of a CCD camera, a CCD sensor, an image scanner and the like. Thereafter, the images are inputted to an image processing unit 3 of the computer system 9 as image data, and applied with proper image processes, such as image distortion correction, edge enhancement, color correction, and tone correction. Note that, if an image sensing camera for sensing the parallax images 1 is an electron camera or a TV camera having an image pickup tube, CCD or the like, the image reading means can be omitted.

In a stereoscopic image display method using a lenticular lens, it is known that the greater the number of input images is, the better the quality of a stereoscopic image becomes, although the number of the input images is limited depending on pitch size and the like of the lenticular sheet to be used. Therefore, in the present invention, parallax images between the input parallax images are generated and interpolated by an image interpolation unit 7. The interpolation method disclosed in Japanese Patent Application Laid-Open No. 5-210181 (the corresponding US application No. 722, 713), in which corresponding points of images are found, then images are interpolated and combined on the basis of the corresponding points, can be applied to the above process of the present invention. By performing the interpolation process, "flopping", specific for a stereoscopic image, when seeing the image through a lenticular sheet can be prevented, further, it is possible to give so called "look around effect".

Further, in this embodiment, among the plurality of sensed parallax images, at least two parallax images can be processed so as to represent images sensed from viewpoints which are separated by the distance between the right and left human eyes. For example, as disclosed in the Japanese Patent Application Laid-Open No. 5-210181, first, corresponding points of an identical object in a plurality of images sensed from different viewpoints are extracted, and gaps between images are interpolated by using the extracted corresponding points, thereby forming an original three dimensional object image data in a memory. Next, new three dimensional object image data which represents image seen from a predetermined viewpoints that are separated by a distance between the right and left human eyes are generated. By performing this process, it is possible to obtain images which are expected to be seen from any two viewpoints. Especially, this image processing is important when the distance between object lens does not match the distance between right and left human eyes, or when a three dimensional camera made by Nimslo Camera Limited, for example, is used. If such the image processing is not performed, when a processed image of a stereoscopic image which is finally printed is observed, the right and left images will not be properly seen by right and left eyes, respectively. As a result, the right and left images can not be observed as a stereoscopic image.

Therefore, in the present invention, when parallax between the input parallax images is smaller than a predetermined value, they are applied with image process which increase parallax between the input parallax images so as to match the parallax between right and left human eyes. Thereby, at least two parallax images are generated. Here, determination of parallax between the input parallax images can be performed by applying a known method by extracting specific points. More simply, the distance between object lens of a sensing camera can be inputted as condition data for the image process. Then, the two input images are interpolated with generated images by using the aforesaid conventional image interpolation technique, if necessary, further it is possible to give "look around effect".

The input images processed as above are divided into a plurality of image strips having a predetermined width in accordance with the pitch size of a lenticular sheet to be used. Then, after the image strips are compressed, they are combined into a single image by an image combining unit 8, and stored as an image file. Image signals of the image file are inputted to the printer 10 which will be described later in detail, then the combined image is directly printed on the backside of the transparent lenticular sheet, thereby outputting the combined stereoscopic image 11.

A case where a plurality of original images sensed by a stereoscopic camera or the like are used as input images is explained above. Further, according to the present invention, it is possible to output a combined stereoscopic image on the basis of three dimensional image data generated by a CAD system or a workstation 5 having an image memory 4. In this case, since the three dimensional data already exists in the workstation 5, by calculating data corresponding to images seen from a plurality of view points on the basis of the existing data, the parallax image file 6 including four desired images, e, f, g, and h, for instance, is generated. Then the generated images are applied with above processes, and the combined stereoscopic image 11 is formed.

Note that the three dimensional data can be generated on the basis of a plurality of tomograms, such as CT images and MRI images. In such case, the three dimensional data can be generated by extracting specific points from each tomogram and connecting those points. For example, when the CT images are to be dealt with, the specific points can be extracted only by adjusting slicing levels of each tomogram when necessary. More specifically, by binarizing each tomogram in accordance with a predetermined reference luminous level, for instance, then by connecting outlines, a stereoscopic image can be obtained in a form of stacked contour lines. Note that tone data can be used instead of the luminance level.

FIGS. 2A and 2B are schematic views explaining state of an image at each step of the method of the present invention. FIG. 2A shows an image to be recorded as a stereoscopic image which is generated from image data supplied from a CAD device. Three dimensional data representing a molecular model image A in FIG. 2A, seen from an angle of 7 degrees, for instance, which is generated by the workstation 5 is used in the embodiment, and data representing images seen from viewpoints of desired angles can be obtained by calculation. Obtained image data, namely data representing images e, f, g, and h in FIG. 1 is generated and stored in the parallax image file 6. In this embodiment, the image e is a virtual image of the molecular model seen from the left most position, and the image h is a virtual image of the molecular model seen from the right most position.

Next, these images are divided into image strips of a predetermined width, as shown in FIG. 2B, by the image processing unit 3, and each of the image strips is e1, e2, e3, ..., f1, f2, f3, ..., g1, g2, g3, ..., h1, h2, h3, ... After these image strips are applied with compression or the like when necessary, arranged to an order of h1, g1, f1, e1, h2, g2, f2, e2, h3, ..., and so on. Thereby, a combined image 8a is obtained. Note, the image strips and their combined image 8a in FIG. 2B are just for explanation, and the actual number of division and divided lines are much larger than those in FIG. 2B. When the number of division for each input image is denoted by m, then the number of image strips in the combined image 8a is 4 m. Therefore, the borders between image strips in the combined image 8a are not as smooth. At this time, the width of the image strips e1, f1, g1, and h1 is set so that the sum of the width of the four image strips equals to the pitch P of the lenticular sheet to be used. The combined image 8a formed as described above is printed on backside of a lenticular sheet 12 by the printer 10, thereby obtaining the combined image of a stereoscopic image 11. Further, a protection layer is formed over the printed image of the stereoscopic image 11, thus a stereoscopic image display medium 16 is manufactured. Note that representation in recording materials 13 of the stereoscopic image display medium 16 shows typically the status of recording materials 13 after the combined image is printed, and it does not show actual areas where recording materials of the above image strips are printed.

At this time, there is a predetermined relationship between a pitch Pa of the image consisting of four image strips ei, fi, gi, and hi (i is an integer) (referred as "image pitch Pa", hereinafter) and the pitch P of the lenticular sheet 12. Generally, so called "off center" method in which the pitch of the lenticular sheet is made different from the image pitch is used so that the image which is printed on the backside of the lenticular sheet can be seen as the stereoscopic image throughout the lenticular sheet. For example, if the distance between right and left eyes of a viewer (reference length) is denoted by K, and the number of original parallax images is denoted by n, then $$Pa = n \cdot K \cdot P/(n \cdot K - P)$$

is satisfied. However, when this method is used, the width of each image strip to be printed becomes a value which cannot be obtained by multiplying resolution of a printer system by an integer.

In addition, it may not be possible to divide the image data in a desired number based on a width of image strips of each parallax image a capacity of the parallax images generated by the workstation 5. That is, the image data may have excess or lack of data. In such a case, the compression ratio of image compression which is performed when each parallax image is divided is to be changed in accordance with the position of each lenticular lens. Further, when a predetermined amount of offset with respect to the pitch of the lenticular sheet arises, it is possible to set the image strips so that the image strip at the offset position (e.g., hj−1 or ej−1; j=integer) is deleted, then the image strips, hj, gj, fj, ej, ..., are printed from the beginning of the next pitch of the lenticular sheet.

Figure 3:
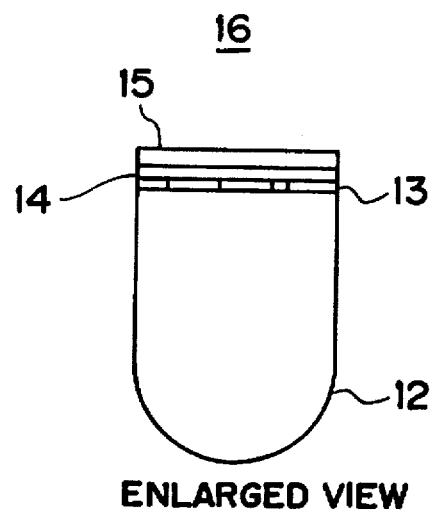
FIG. 3 is an enlarged view of a unit portion of a stereoscopic image display medium.

As shown in FIG. 3, a protection layer 15 is laminated for protecting the recording material 13, such as toner and ink, which is printed on the lenticular sheet 12, thus the stereoscopic image display medium 16 is formed. The protection layer 15 can generally be a transparent plastic film, and if so, the laminated image of the stereoscopic image 11 becomes transparent. Therefore, when it is illuminated by a light source, such as a fluorescent lamp, from back, the stereoscopic image can be observed. In contrast, when a colored film, such as black and navy blue films, is used as the protection layer 15, by illuminating the lenticular sheet from the front for observing the stereoscopic image, it is possible to enhance contrast of diffuse reflection light from the recording materials 13, such as toner and ink. Thereby, the stereoscopic image of good contrast can be seen. Further, a diffusion material 14, such as paper, can be layered between the recording material 13 and the protection layer 15.

Next, the printer 10 will be described below with reference to FIGS. 4 and 5.

Figure 4:
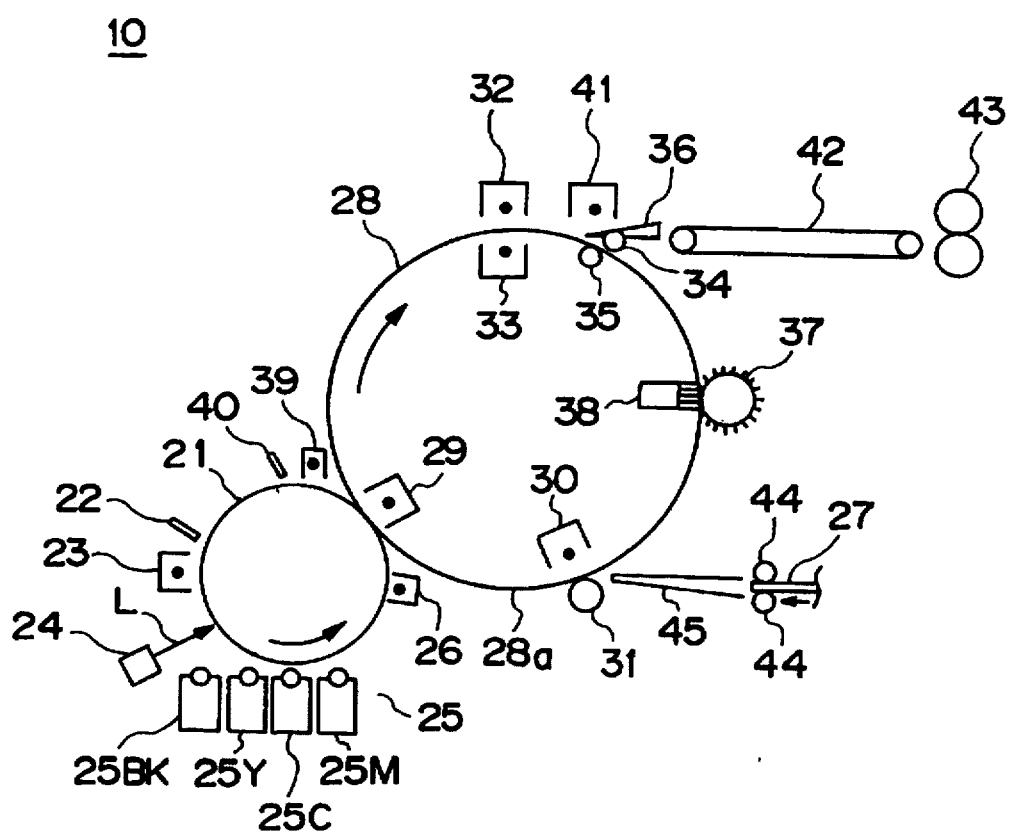
FIG. 4 is a diagram illustrating a configuration of a printer used in the present invention according to the embodiment.

The printer 10 includes an image holding body, namely an electrostatic drum 21, which rotates in the direction of an arrow in FIG. 4 and is supported by a shaft at its center so as to be able to rotate freely. Around the electrostatic drum 21, an image forming units are provided. As the image forming units, any conventional units can be used. In this embodiment, a pre-exposure lamp 22 for discharging and initializing the electrostatic drum 21, a primary charger 23 for uniformly charging the electrostatic drum 21, an optical unit 24 consisting of a laser beam scanning unit and the like for focusing an optical image which is color-separated at predetermined timing or a light beam L corresponding to the optical image on the surface of the electrostatic drum 21 and for forming an electrostatic latent image, a developer 25 for visualizing the electrostatic latent image on the electrostatic drum 21, and a secondary charger 26 are provided around the electrostatic drum 21 in the rotating direction in the order of the above explanation.

The developer 25 is a horizontal moving type developer which moves in the tangent direction with respect to the outer surface of the electrostatic drum 21 in this embodiment, and includes four developers for holding four developing materials (toner), namely, developers 25M, 25C, 25Y, and 25BK, for holding magenta, cyan, yellow, and black developing materials, respectively. The horizontal displacing type developer 25 conveys the desired developer to a position facing the outer surface of the electrostatic drum 21 by a not-shown displacing mechanism in accordance with an optical image of a color selected by the optical unit 24 or with the light beam L corresponding to the optical image. Then the developing material, namely toner, is electrostatically attracted by the electrostatic drum 21 through a gap, thereby developing the electrostatic latent image on the electrostatic drum 21. Accordingly, the toner image of the selected color is formed.

The toner image formed on the electrostatic drum 21 is transferred to the lenticular sheet 27 which is held and conveyed by a transfer medium holding unit. In this embodiment, a transfer drum 28 which is supported by a shaft so as to be rotatable is used as the transfer medium holding unit. The transfer drum 28 faces to the electrostatic drum 21 and touches the surface of the electrostatic drum 21 at a point S, or is placed at a position where the transfer drum 28 is slightly apart from the electrostatic drum 21. The transfer drum 28 may have a same constitution of a transfer drum which is used in an aforesaid conventional recording device, for example, and it consists of a drum-shaped frame wrapped with a holding member, generally the holding sheet 28a, such as a high resistant film, for holding a recording medium (lenticular sheet) to form a cylindrical shape. The lenticular sheet 27 is supplied to the transfer drum 28, and wraps over the drum 28. When the lenticular sheet 27 wraps the transfer drum 28, electrostatic attracting force is used so that the holding sheet 28a attracts the lenticular sheet 27, or a gripper which is provided at a part of the transfer drum 28 mechanically holds the top edge of the lenticular sheet 27 so as to be held and fixed on the holding sheet 28a.

A holding sheet used for printing on an OHP sheet and the like in a conventional ink jet printer can be used as the holding sheet 28a, and preferably it is elastic. More specifically, the holding sheet 28a desirably has enough elasticity so as not to give any effect to concave and convex shapes in the lens side (curved side) of the lenticular sheet 27 when an image is printed on the back (flat side) of the lenticular sheet. Further, at the transfer position in the transfer drum 28 facing to the electrostatic drum 21, a transfer corona charger 29 is provided inside of the cylindrical shape of the holding sheet 28a (opposite of the holding surface) so as to face to the electrostatic drum 21.

The transfer drum 28 is driven to rotate in the direction of an arrow in FIG. 4, and in the upstream of the transfer position where the color charger 29 is provided, an attracting corona charger 30 is provided inside of the cylindrical shape of the holding sheet 28a, further an electric conducting roller 31 is provided so as to face to the attracting corona charger 30 in the holding side (outside of the cylindrical shape) of the holding sheet 28a separated by the holding sheet 28a.

Further, two corona chargers 32 and 33, separated by the holding sheet 28a, for discharging are provided in the downstream of the transfer position, and in its further downstream, pressing rollers 34 and 35, separated by the holding sheet 28a, for separating the lenticular sheet 27 from the holding sheet 28a are provided. Near the rollers 34 and 35, a separation blade 36 is provided in the holding side of the holding sheet 28a. Further downstream, a brush roller 37 for cleaning the holding surface of the holding sheet 28a and, a corona discharger or a brush type discharger 38, for discharging attracting force (remaining Coulomb force and van der Waals force) are provided.

Further, around the electrostatic drum 21, a discharger 39 for discharging electrostatic charge from the surface of the electrostatic drum 21 and a cleaning blade 40 for removing remaining toner are provided. Furthermore, it would be better to set a corona discharger 41 near the separation blade 36, if necessary, for the purpose of preventing the image from being deteriorated by separation discharge which occurs when the lenticular sheet 27 is separated from the holding sheet 28a and to perform AC corona discharge. The lenticular sheet 27 separated from the holding sheet 28a by the separation blade 36 is conveyed to a fixing unit 43, consisting of a pair of fixing rollers, by a conveyer 42. At the fixing unit 43, the toner image on the lenticular sheet 27 is fixed. Thereafter, a unit (not shown) having a configuration of a conventional laminator provides the protection layer 15.

In the upstream just above the attracting corona charger 30 and the electric conducting roller 31, there is provided a guide 45 for guiding the lenticular sheet 27 which is inputted from a lenticular sheet feeding unit to an attracting position via a pair of resist rollers 44. Further, as described with reference to FIG. 2, in this embodiment, it is necessary to copy a predetermined image inside of the pitch P of the lenticular sheet 27 at high precision. Therefore, detecting unit 46, as shown in FIG. 5, for detecting a feed state of the lenticular sheet 27 is provided at the attracting position where the top edge of the lenticular sheet 27 is attracted by the holding sheet 28a. The detecting unit 46 may be a unit which mechanically detects the concave and convex shapes of the lenticular sheet 27, an optical detecting unit, and so on. Further, after the lenticular sheet 27 is attracted by the holding sheet 28a, rotational speeds of the drums are controlled so as to be uniform, or for higher definition printing, output from a sensor 56 by each convex of the lenticular sheet 27 is sent from the detecting unit 46 to a controller so that the rotations of drums are synchronized.

Figure 6:
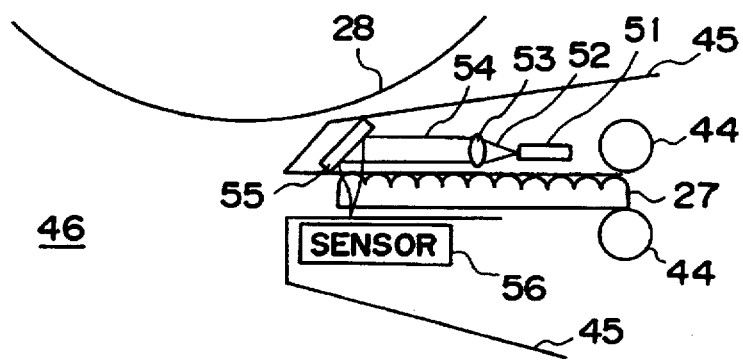
FIG. 6 is a diagram illustrating a main part of the printer.

FIG. 6 shows a configuration of the optical detecting unit 46 used in the embodiment. Beam 52 from a light source 51, such as a semiconductor laser and an LED, is bent to be a substantial parallel beam 54 by a collimating lens 53, changed its traveling direction by a mirror 55 provided in the guide 45, then reaches the lenticular sheet 27. The lenticular sheet 27 is designed so that its thickness is substantially equal to its focal length, thus the incoming parallel beam 54 is focused on the backside of the lenticular sheet 27. By detecting a focused spot by the sensor 56, the feed state of the lenticular sheet can be detected.

A conventional position sensor (PSD), a multiple-divided sensor, one dimensional line sensor, and two dimensional line sensor are available as the sensor 56. Further, the parallel beam 54 used for the detection of the lenticular sheet can spread in a sheet form, and in such a case, cylindrical lens is used as the collimating lens 53. As described above, combinations of the beam and the sensor for the detection can be chosen properly.

In this embodiment, a LED is used as the light source 51 and a double-divided sensor which is arranged so that the direction of its dividing line matches that of the strips of the lenticular sheet 27 when it is fed properly is used as the sensor 56, thereby constructing the detecting system. Two detecting systems are provided at two positions corresponding to the top edge of the lenticular sheet 27. At this time, the shape of the spot on the sensor 56 becomes a one dimensional line, namely a focal line, through the lenticular sheet 27. The difference between any combination of outputs from the two double-divided sensors is calculated, and the rotation of the focal lines, or tilt of the lenticular sheet 27 is determined. If the detected signal is within a predetermined range, the top edge of the lenticular sheet 27 is gripped by the holding sheet 28a, then wrapped around the transfer drum 28.

Figure 5:
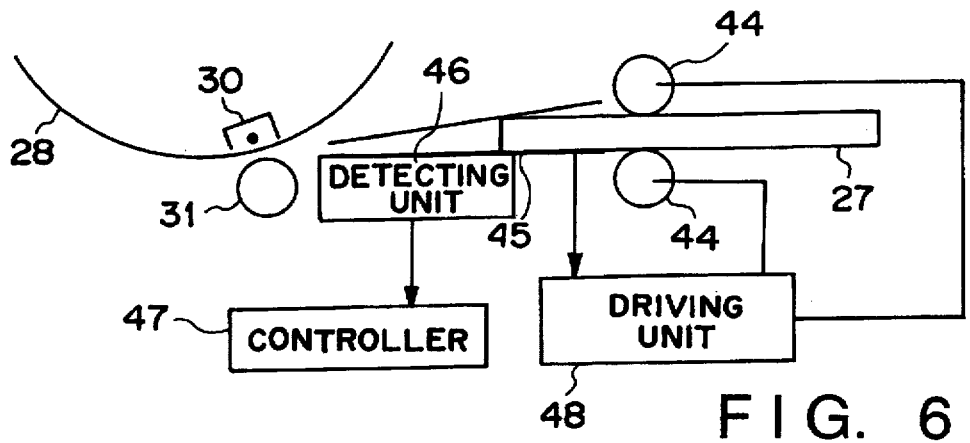
FIG. 5 is a diagram illustrating a main part of the printer.

Referring to FIG. 5, the resist rollers 44 and the guide 45 in the lenticular sheet feeding unit are driven by a driving unit 48, such as a pulse motor or a stepping motor, which is controlled by a controller 47 in accordance with detected signal from the detecting unit 46, thus the lenticular sheet 27 is moved so that the detected signal is within a predetermined range. When the detected signal satisfies the condition, the feeding position of the lenticular sheet 27 is controlled so that the lenticular sheet is gripped by the holding sheet 28a. When the apparatus is arranged so as to drive the guide, the detecting unit 46 must not be provided on the guide 45 as a single unit.

Figure 7:
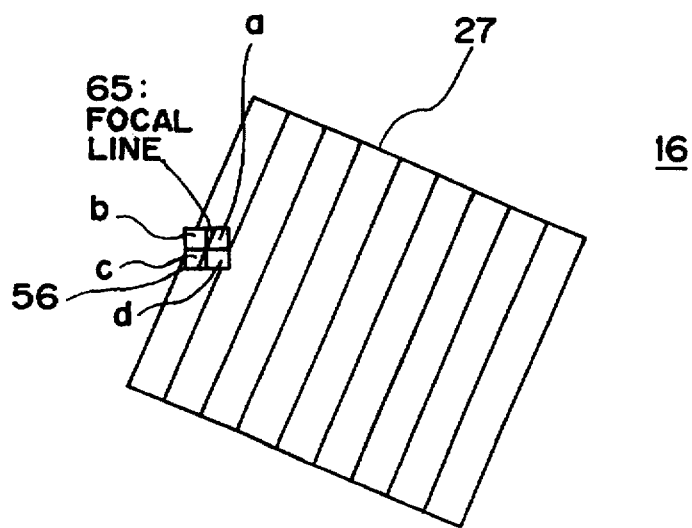
FIG. 7 is a diagram illustrating a configuration of the stereoscopic image display medium.

Further, in a case where a single four-divided sensor is used as the sensor 56, it is set so that the direction of its one divisional line matches that of the strips of the lenticular sheet 27 when it is fed properly, and that focal line of the lenticular sheet 27 is in the direction of the one divisional line of the sensor 56 when the lenticular sheet 27 is properly fed. In the detecting process, two output signals from diagonal positions of the four-divided sensor are added, therefore obtaining two sums, and a difference between the sums is calculated. Accordingly, the rotation of the focal line, or tilt of the lenticular sheet, can be detected by the difference. FIG. 7 shows an example of a focal line 65 when the lenticular sheet 27 is tilted. Letting outputs from each position of the four-divided sensor at this time be a, b, c, and d, then the tilt of the lenticular sheet 27 can be judged from the result of calculation by a function, (a+c)−(b+d).

Furthermore, it is desirable to control the feed state of the lenticular sheet 27 so as to be placed at a predetermined position by driving the resist rollers 44 and the guide 45 provided in the lenticular sheet feeding unit in accordance with a fed-back signal detected by the detecting unit 46.

In the embodiment, the electrostatic drum 21 touches the transfer drum 28 at a single position which is denoted by a point S in FIG. 4 as described above, so it is possible to set each position of the image strips to be printed in a single pitch of the lenticular sheet 27 at the same precision as that of printing position to overlay color elements of an image. Therefore, it is possible to obtain a high quality stereoscopic image.

Further, besides the method which is described above as the method for copying an image of the present invention, a method in which electrostatic drums are provided for each color, a lenticular sheet is attracted or fixed on a conveying belt, then color-separated images on the electrostatic drum are transferred to the lenticular sheet can be used. In this case, the feed state of the lenticular sheet on the conveying belt is also to be detected as in the method described above, and the apparatus is set so that the position of the lenticular sheet is adjusted when necessary. If the apparatus has a configuration which transfers each color-separated image sequentially, the lenticular sheet is not necessary to wrap around the transfer drum, different from a case shown in FIG. 4. Accordingly, as flexibility required to the lenticular sheet are not so strict, a large thick sheet can be used and a large size image of a stereoscopic image can be recorded.

Regarding material which can be used as the lenticular sheet 27 in this embodiment, it is required that the material has transparency, thermal resistance, stability in size, and mechanical strength. Accordingly, plastic materials made of acrylate, ester, vinyl chloride, polyolefin, or polyethylene and the like can be used. More specifically, for example, polymethyl methacrylate, polyester, rigid polyvinyl chloride resin, polystyrene, polypropylene, polyvinyl acetate, cellulose acetate, cellulose triacetate, and polycarbonate can be used.

Especially, in the printer 10 of the present invention, heat of 150 to 170 degrees centigrade is applied for 3 to 5 seconds in a process for fixing printing material, such as ink and toner. Therefore, to be the material of the lenticular sheet, its thermal resistance is desirably higher than the temperature applied during the process. Thus, polymethyl methacrylate, polyester, cellulose triacetate, polycarbonate, and polyethylene terephthalate are preferred. However, since the heat is applied for a short period, thus a material of vinyl chloride whose thermal resistance is in the range of 66 to 93 degrees centigrade can be used by thickening the thickness of the lenticular sheet, and/or by efficiently cooling the lenticular sheet after exposure.

Further, the backside of the lenticular sheet (flat side) is preferably processed so as to increase adhesion with ink or toner, and a method such as increasing surface energy and polarizing the surface is used. For example, there are a conventional corona discharging process, process with chromic acid, and the like. While applying the process, it is possible to coat the backside of the lenticular sheet with a surface processing material. In the lens side of the lenticular sheet which touches the transfer drum when it is attracted, anti-charging material is preferably coated in order to reduce separation charge produced when the lenticular sheet 27 is separated from the holding sheet 28a.

Figure 8:
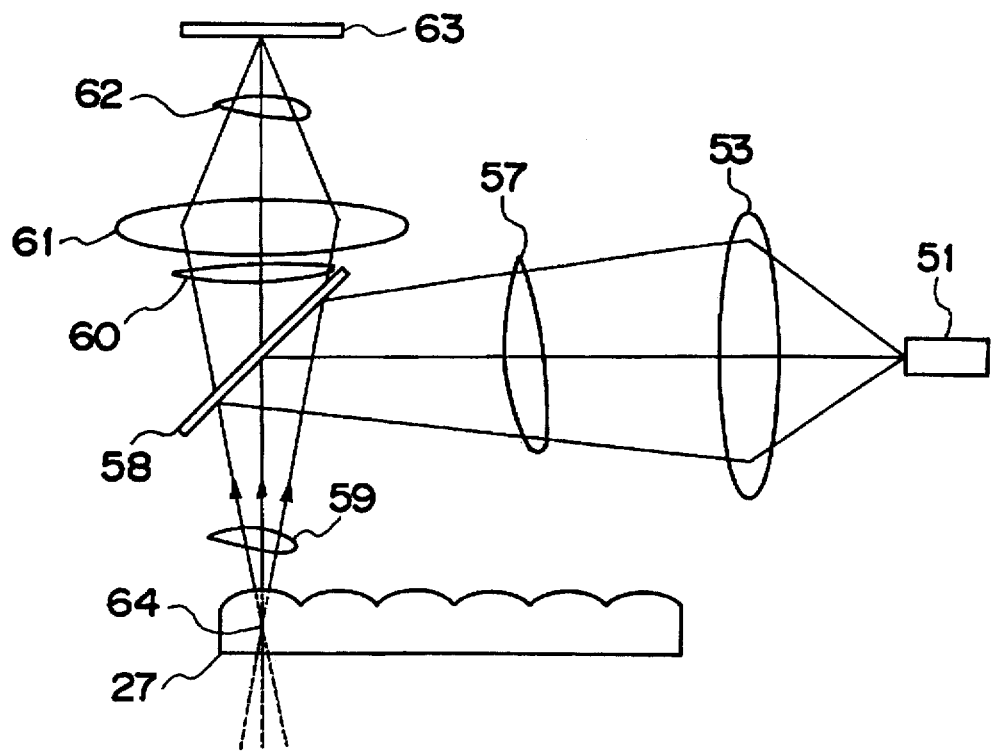
FIG. 8 is an explanatory view showing an optical detecting unit according to the embodiment.
Figure 9:
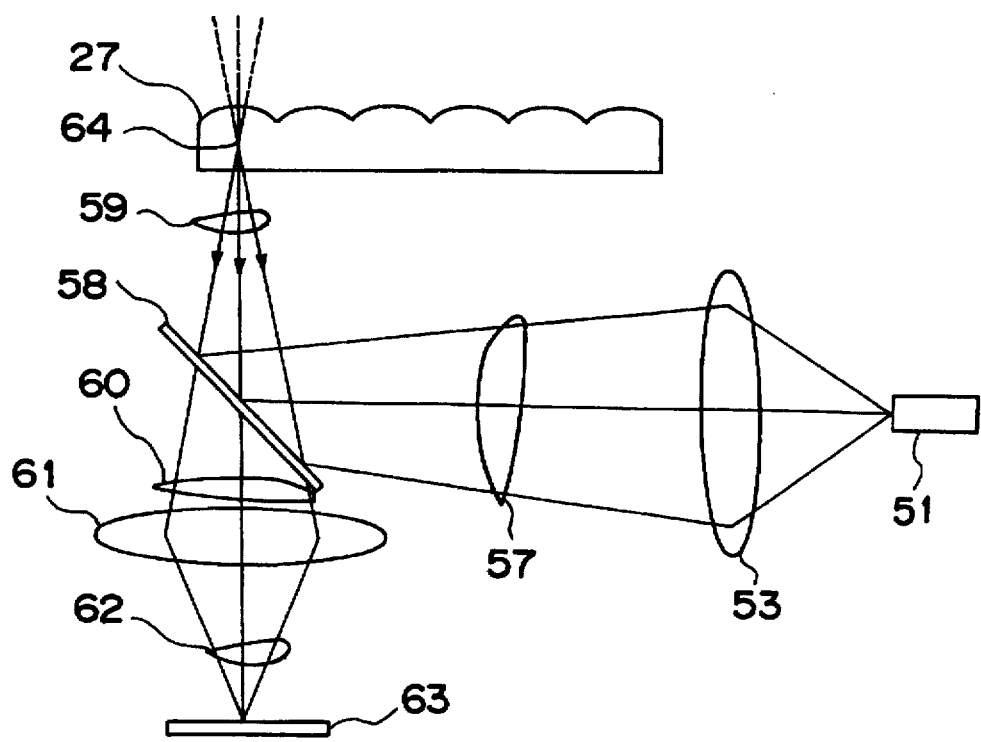
FIG. 9 is an explanatory view showing an optical detecting unit according to another embodiment.

In the above embodiment, a case where a transparent optical detecting unit is used as the detecting unit 46, however, a reflection type optical detecting unit can be used as shown in FIGS. 8 and 9.

Referring to FIG. 8, the beam from the light source 51 is bent by the converging lens 53 to become converging beam 57 which spread in a sheet form and which converges near the center of curvature 64 of the lenticular lens, then reflected by a half mirror 58 and enters the lenticular sheet 27. At this time, the beam is incident on the lens of the lenticular sheet 27 almost perpendicular to its surface, and a part of the flux is reflected by Fresnel reflection and forms diverging beam 59, then becomes diverging beam 60 after passing through the half mirror 58. The diverging beam 60 can be considered as a radiated light from the center of the curvature of the lenticular lens, and it is changed to a converging beam 62 by a converging lens 61 which is provided at the position so that the point 64 is an object point of the lens 61. The converging beam 62 converges on the sensor 63 and forms a focal line. By detecting the focal line as in the same manner as described above, the tilt of the lenticular sheet 27 can be detected.

In order to employ this method, the optical unit of the detecting unit and the lenticular sheet do not principally form a single body. Thus the convergent point of the converging beam 57 of the detection beam does not match the center of the curvature of the lens of the lenticular sheet 27, precisely, which result in producing a slightly defocused image. However, in this embodiment, to detect the tilt of the lenticular sheet 27 with respect to the transfer drum 28 and to control the lenticular sheet 27 are important, and if the detection beam is defocused, the center of intensity of focal lines on the sensor 63 does not change. Therefore, the tilt of the lenticular sheet 27 can be detected effectively by employing the method described above.

Further, by using the converging beam 57 which spread in a broad area and which converges near the center of curvature 64 as the detection beam, and by arranging the converging lens 61 so that the convergent point is to be the object point of the lens 61, it is possible to enhance the contrast of the reflected light by Fresnel reflection from the lenticular sheet, thus the tilt of the lenticular sheet 27 can be properly detected. Parallel beam can be used as the detection beam as far as the contrast of the reflected light is enhanced enough.

FIG. 9 shows an example of modification of the reflection type optical detecting unit. According to this configuration shown in FIG. 9, a method in which the detection beam enters from the backside of the lenticular sheet 27 (flat side) is employed. This detecting unit is constructed so that reflected beam by Fresnel reflection on the back surface of the lens of the lenticular sheet 27 is detected. Note that, in these reflection type detecting units as described above, by arranging the optical system so that the focusing point is formed on the sensor 63 by using the converging lens 53' and the curvature of the lens of the lenticular sheet 27 (i.e., convex side (outside of the lens) in FIG. 8 and concave side (inside of the lens) in FIG. 9), the converging lens 61 can be omitted.

Figure 10:
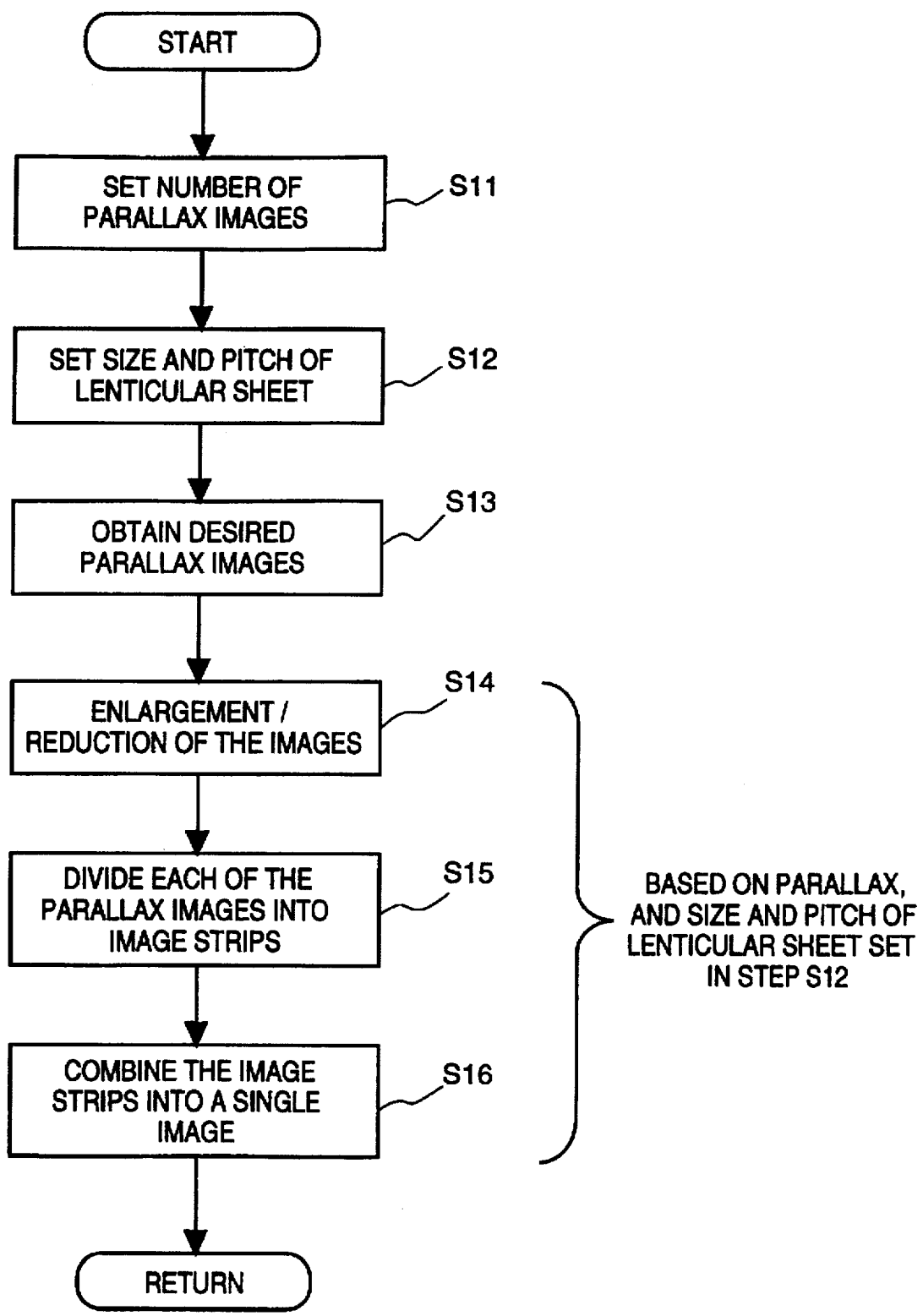
FIG. 10 is a flowchart showing a process of forming a single image in which a plurality of image strips are combined.

FIG. 10 is a flowchart showing a process of forming a single image in which a plurality of image strips are combined.

At step S11, the number of parallax images used for forming a stereoscopic image is set. At step S12, a size and pitch of a lenticular lens sheet whose backside is to be printed with an image are set. The size includes a sheet length, width and thickness. At step S13, the desired number of parallax images corresponding to the number set at step S11 are obtained via camera or from three dimensional data in computer memory.

At steps S14–S16, the obtained parallax images are processed based on a parallax value, and the size and pitch of the lenticular sheet set in step S12, according to the present invention.

At step S14, the parallax images are enlarged or reduced so that the size of the parallax images is matched with the size and pitch of the lenticular sheet. At step S15, each of the parallax images is divided into a plurality of image strips. At step S16, these image strips are combined into a single image which can be displayed as a stereoscopic image through lenticular lens, and the combined single image is stored in a page memory (not shown).

Figure 11:
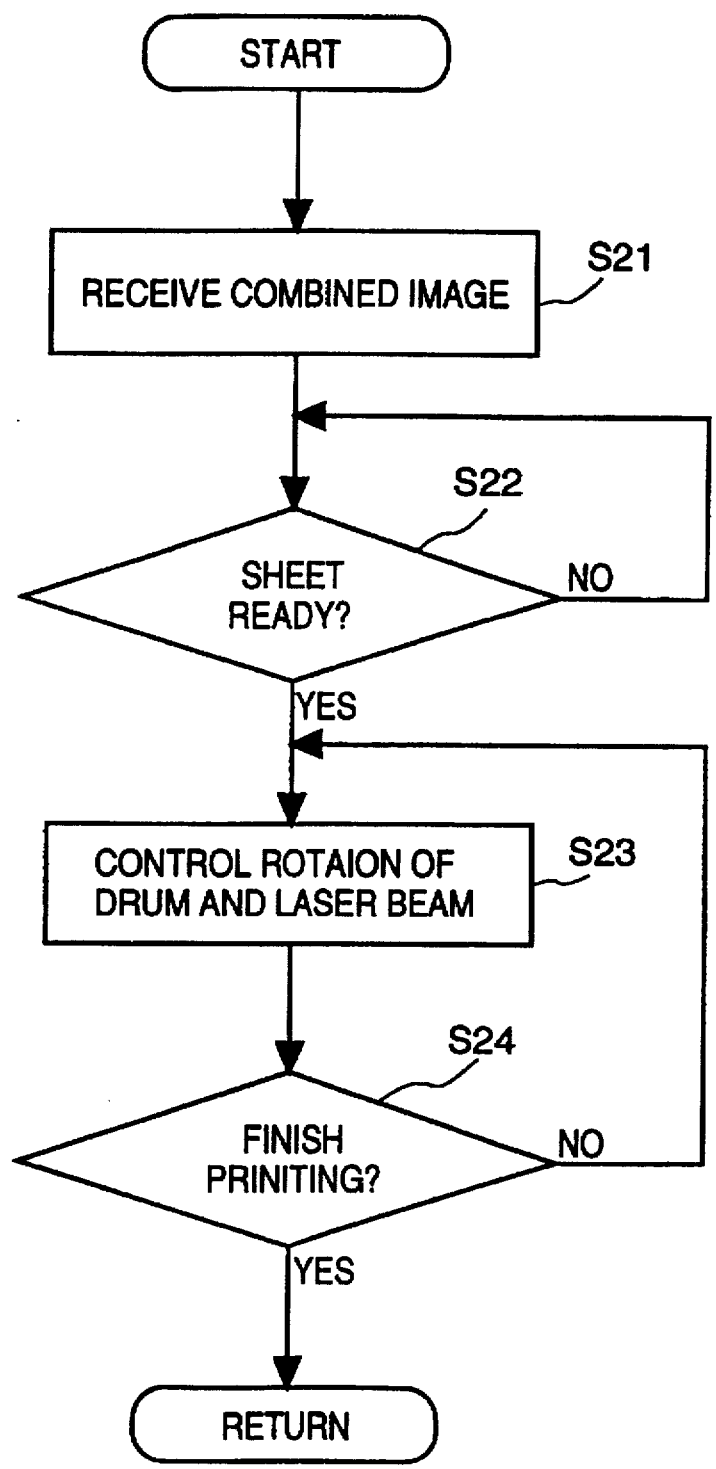
FIG. 11 is a flowchart showing a process of printing the formed single image on the backside of a lenticular lens sheet.

FIG. 11 is a flowchart showing a process of printing the formed single image on the backside of a lenticular lens sheet.

At step S21, the combined image formed in step S16 is received by a color laser printer. At step S22, it waits until a supply state of a lenticular lens sheet is ready, in which state a top end of the sheet is detected by the detecting unit.

On ready, one sheet is taken up and fixed on the holding sheet 28a, and then at step 23, the printing sequence is started with controlling rotation of the transfer drum 28 and the electrostatic drum 21 and scanning by a laser beam. Above control may be performed based on the size and pitch of the lenticular lens sheet set in step S12, or based on the detection of the lens by the detection unit 46.

At step S24, it waits until the printing sequence is completed.

The process of forming a combined single image and printing the formed single image shown in FIGS. 10 and 11 is only one example of many processes which perform the present sequence of the invention.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

The present invention is not limited to the above embodiments and various changes and modifications can be made within the spirit and scope of the present invention. Therefore to apprise the public of the scope of the present invention, the following claims are made.

What is claimed is:

1. A stereoscopic image recording method comprising the steps of:
    dividing a plurality of parallax images into a plurality of image strips, respectively;
    combining the plurality of image strips to obtain a combined image;
    recording a latent image of the combined image on an electrostatic drum as an electrostatic latent image; and
    transferring or printing the electrostatic latent image on a backside of a transparent lenticular sheet with toner or ink.

2. The stereoscopic image recording method according to claim 1, wherein said lenticular sheet is made from a transparent plastic.

3. The stereoscopic image recording method according to claim 1, wherein said lenticular sheet is made from materials selected from acetate, acrylate, ester, vinyl chloride, polyolefin, polycarbonate, and polyethylene.

4. The stereoscopic image recording method according to claim 1, wherein said lenticular sheet is made from materials selected from polymethyl methacrylate, cellulose triacetate, polyester, and polyethylene terephthalate.

5. The stereoscopic image recording method according to claim 1, wherein said lenticular sheet has sufficient elasticity to wrap around a transfer drum.

6. The stereoscopic image recording method according to claim 1, wherein the plurality of parallax images are formed from three dimensional image data generated by a computer.

7. The stereoscopic image recording method according to claim 6, wherein said three dimensional image data is synthesized by extracting specific points from a great number of tomograms.

8. The stereoscopic image recording method according to claim 1, wherein the plurality of parallax images are recorded by a stereoscopic camera having at least two object lenses.

9. The stereoscopic image recording method according to claim 8, wherein, when a distance between the object lenses of the stereoscopic camera is different from a distance between right and left human eyes, at least two images recorded by the stereoscopic camera are corrected so that the corrected images correspond to two images seen at view points separated at the distance between the right and left human eyes.

10. The stereoscopic image recording method according to claim 8, wherein a plurality of images are interpolated based on at least two images recorded by the stereoscopic camera.

11. A stereoscopic image recording apparatus comprising:
    image processing means for dividing a plurality of parallax images into a plurality of image strips, respectively, and for combining the plurality of image strips to form a combined image;
    recording means for recording the combined image formed by said image processing means on an electrostatic drum as an electrostatic latent image; and
    transferring or printing means for transferring or printing the electrostatic latent image recorded on the electrostatic drum on a backside of a transparent lenticular sheet with toner or ink.

12. The stereoscopic image recording apparatus according to claim 11, wherein said transferring or printing means includes a transfer drum which holds said lenticular sheet for transferring or printing the latent image with toner or ink.

13. The stereoscopic image recording apparatus according to claim 12, wherein said transfer drum has a holding sheet having sufficient elasticity so as to accommodate concave and convex shapes on a lens side of the lenticular sheet.

14. The stereoscopic image recording apparatus according to claim 11, further comprising storage means for generating or storing three dimensional image data used for generating the plurality of parallax images.

15. The stereoscopic image recording apparatus according to claim 11, further comprising a camera or an image scanner means for reading the plurality of parallax images and inputting image data of the plurality of parallax images into said image processing means.

16. The stereoscopic image recording apparatus according to claim 11, further comprising detecting means for detecting a relative position of said lenticular sheet with respect to said transferring or printing means and position controlling means for controlling the relative position in accordance with an output signal from said detecting means.

17. The stereoscopic image recording apparatus according to claim 16, further comprising fixing means for fixing said lenticular sheet on said transferring or printing means when the output signal from said detecting means is in a predetermined range.

18. The stereoscopic image recording apparatus according to claim 16, further comprising feeding means for feeding said lenticular sheet, wherein said feeding means is controlled by said position controlling means.

19. A stereoscopic image recording apparatus comprising:

image processing means for dividing a plurality of parallax images into a plurality of image strips, respectively, and for forming a combined image by combining the plurality of image strips;

recording means for recording the combined image formed by said image processing means on a photo sensing drum as a latent image; and transferring or printing means for transferring or printing the latent image recorded on the photo sensing drum on a backside of a transparent lenticular sheet with toner or ink, wherein said transferring or printing means includes a transfer drum which holds said lenticular sheet for transferring or printing the latent image with toner or ink, and said transfer drum has a holding sheet having an elasticity so that a lens side of said lenticular sheet is undamaged by the transferring or printing on the backside of said lenticular sheet.

* * * * *